US011414089B2

(12) United States Patent
Ambruzs et al.

(10) Patent No.: US 11,414,089 B2
(45) Date of Patent: Aug. 16, 2022

(54) METHOD TO DETERMINE THE ROLL ANGLE OF A MOTORCYCLE

(71) Applicant: Continental Teves AG & Co. oHG, Frankfurt am Main (DE)

(72) Inventors: Gabor Ambruzs, Nemesvámos (HU); Robert Weisz, Veszprem (HU); David Szaloky, Veszprem (HU)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 967 days.

(21) Appl. No.: 16/080,839

(22) PCT Filed: Mar. 3, 2017

(86) PCT No.: PCT/EP2017/055104
§ 371 (c)(1),
(2) Date: Aug. 29, 2018

(87) PCT Pub. No.: WO2017/149158
PCT Pub. Date: Sep. 8, 2017

(65) Prior Publication Data
US 2019/0054924 A1 Feb. 21, 2019

(30) Foreign Application Priority Data
Mar. 4, 2016 (EP) .................................... 16465506

(51) Int. Cl.
*B60W 40/112* (2012.01)
*B60T 8/17* (2006.01)
(Continued)

(52) U.S. Cl.
CPC ......... *B60W 40/112* (2013.01); *B60T 8/1706* (2013.01); *B60T 8/261* (2013.01);
(Continued)

(58) Field of Classification Search
CPC .... B60T 2230/03; B60T 8/1706; B60T 8/172; B60T 8/261; B60T 8/3225;
(Continued)

(56) References Cited

U.S. PATENT DOCUMENTS

| 5,445,443 A | 8/1995 | Hauser et al. |
| 8,155,798 B2 | 4/2012 | Seiniger et al. |

(Continued)

FOREIGN PATENT DOCUMENTS

| CN | 102416956 A | 4/2012 |
| CN | 104853966 A | 8/2015 |

(Continued)

OTHER PUBLICATIONS

International Search Report and Written Opinion for International Application No. PCT/EP2017/055104, dated Jun. 8, 2017—11 pages.

(Continued)

*Primary Examiner* — Catherine T. Rastovski
(74) *Attorney, Agent, or Firm* — RatnerPrestia

(57) ABSTRACT

A method to determine a roll angle ($\lambda_E$) of a vehicle, wherein the roll angle ($\lambda_E$) is calculated as a combination of at least a first roll angle variable ($\lambda_1$) and a second roll angle variable ($\lambda_2$), wherein the first roll angle variable ($\lambda_1$) is determined from an acquired rolling rate ($\dot{\lambda}_m$) of the vehicle using a first method, wherein the second roll angle variable ($\lambda_2$) is determined from one or more further vehicle movement dynamics characteristic variables using a second method.

14 Claims, 7 Drawing Sheets

(51) Int. Cl.
| | |
|---|---|
| *B60T 8/26* | (2006.01) |
| *B60T 8/32* | (2006.01) |
| *B60W 40/114* | (2012.01) |
| *G06F 17/10* | (2006.01) |
| *C09K 11/77* | (2006.01) |
| *G01T 1/20* | (2006.01) |
| *G01T 1/202* | (2006.01) |
| *B60W 50/00* | (2006.01) |

(52) U.S. Cl.
CPC ......... *B60T 8/3225* (2013.01); *B60W 40/114* (2013.01); *C09K 11/7791* (2013.01); *G01T 1/2006* (2013.01); *G01T 1/2018* (2013.01); *G01T 1/2023* (2013.01); *G06F 17/10* (2013.01); *B60W 2050/0052* (2013.01); *B60W 2050/0055* (2013.01); *B60W 2050/0056* (2013.01)

(58) Field of Classification Search
CPC . B60W 2050/0055; B60W 2050/0056; B60W 2300/36; B60W 40/112; B60W 40/114; B60W 2050/0052; B60W 2520/10; B60Y 2200/12; G06F 17/10; C09K 11/7791; G01T 1/2006; G01T 1/2018; G01T 1/2023

See application file for complete search history.

(56) References Cited

U.S. PATENT DOCUMENTS

| | | | |
|---|---|---|---|
| 8,185,271 B2 | 5/2012 | Tichy et al. | |
| 9,616,900 B2 | 4/2017 | Chen et al. | |
| 9,630,672 B2 | 4/2017 | Inoue et al. | |
| 9,694,812 B2 | 7/2017 | Ammon et al. | |
| 10,628,707 B2 | 4/2020 | Steinhardt | |
| 2003/0055549 A1* | 3/2003 | Barta | B60W 10/184 701/70 |
| 2007/0156315 A1 | 7/2007 | Raab et al. | |
| 2009/0222164 A1* | 9/2009 | Seiniger | B60T 8/172 701/36 |
| 2011/0082614 A1 | 4/2011 | Tichy et al. | |
| 2015/0274175 A1* | 10/2015 | Okoshi | B60W 40/112 702/151 |

FOREIGN PATENT DOCUMENTS

| | | |
|---|---|---|
| CN | 105339227 A | 2/2016 |
| DE | 4244112 A1 | 6/1994 |
| DE | 10039978 A1 | 5/2001 |
| EP | 2127988 A1 | 12/2009 |
| IT | MI20070559 A1 | 9/2008 |
| JP | 2009514721 A | 4/2009 |
| JP | 2010012903 A | 1/2010 |
| JP | 2011128093 A | 6/2011 |
| JP | 2016007979 A | 1/2016 |
| KR | 20140067120 A | 6/2014 |
| WO | 0201151 A1 | 1/2002 |
| WO | 2007096319 A1 | 8/2007 |
| WO | 2007107935 A1 | 9/2007 |

OTHER PUBLICATIONS

Korean Office Action for Korean Application No. 10-2018-7025181, dated Sep. 17, 2019, with translation, 13 pages.
Chinese Office Action for Chinese Application No. 201780013894.X, dated Jul. 9, 2021, with translation, 14 pages.
Chinese Office Action for Chinese Application No. 201780013894.X, dated Nov. 20, 2020, 8 pages.
Korean Office Action for Korean Application No. 10-2020-7013468, dated Jul. 11, 2020 with translation, 6 pages.
European Communication Pursuant to Article 94(3) for European Application No. 17707912.6, dated Jan. 25, 2021, 3 pages.
English Translation of the Japanese Office Action for Japanese Application No. 2018-546422, dated Oct. 28, 2019, 5 pages.
Korean Decision for Grant of Patent for Korean Application No. 10-2020-7013468, dated Jan. 27, 2022, with translation, 4 pages.

* cited by examiner

METHOD TO DETERMINE THE ROLL ANGLE OF A MOTORCYCLE

CROSS REFERENCE TO RELATED APPLICATIONS

This application is the U.S. National Phase Application of PCT International Application No. PCT/EP2017/055104, filed Mar. 3, 2017, which claims priority to European Patent Application No. 16465506, filed Mar. 4, 2016, the contents of such applications being incorporated by reference herein.

FIELD OF THE INVENTION

The invention is directed to a method and a device for determining the roll angle of a motorcycle and/or a vehicle.

BACKGROUND OF THE INVENTION

Modern motorcycle antilock brake systems (ABS) and integral brake systems are very highly developed and therefore relatively reliable for braking operations during straight-ahead travel and braking operations in moderately sloping positions. In relatively severely sloping positions, the parameters of the brake system (for example the distribution of the braking force, the gradient of the braking pressure and the control strategy) have to be adapted to cornering in order also to ensure safe braking when cornering occurs. Knowledge of the sloping position angle (roll angle) is essential for this. However, turning light systems, chassis systems and future vehicle movement dynamics control systems also require the roll angle as an input variable. Known systems for measuring the roll angle during driving are either too inaccurate or too expensive for series applications. The underlying measurement principles for determining the roll angle are either suitable only for steady-state situations or only for non-steady-state travel situations.

Document DE 100 39 978 C2, incorporated by reference herein, discloses a device for measuring the angle of inclination with respect to the direction of gravity or the direction of the resulting contact force which comprises a sensor arrangement and an evaluation unit which is connected in an electrically conductive fashion, in which case the sensor arrangement has two acceleration sensors, and the evaluation unit calculates the angle of inclination on the basis of the measured acceleration values.

Document DE 42 44 112 C2, incorporated by reference herein, discloses an antilock brake system for motorcycles which comprises, inter alia, an auxiliary circuit which calculates the angle of the sloping position of the vehicle by means of two acceleration sensors.

A method for determining the roll angle and the pitch angle of a two-wheeled vehicle using an adaptive filter is described in WO 02/01151, incorporated by reference herein.

Document EP 1 989 086 81, incorporated by reference herein, discloses a Method to determine the roll angle of a motorcycle.

SUMMARY OF THE INVENTION

An aspect of the invention is a method and a device for determining the roll angle of a motorcycle and/or a vehicle, which permits more reliable determination of the roll angle compared to existing realizations, particularly in several and/or most and/or all driving conditions, and/or a higher level of accuracy compared to existing realizations, particularly in several and/or most and/or all driving conditions. Particularly in this context, the cost of implementing the method and of manufacturing the device are to be low.

Alternatively preferred, an aspect of the invention is based on the object of making available a method and a device for determining the roll angle of a motorcycle and/or of a vehicle which permits reliable determination of the roll angle with a high level of accuracy at the same time. In this context, the cost of implementing the method and of manufacturing the device are to be low.

Preferably the method according to an aspect of the invention is based on the idea of combining the results or information from two or more different methods for determining a roll angle with one another in order thus to obtain a sufficiently accurate roll angle using cost-effective sensors in all travel situations (steady-state or non-steady-state). For this purpose, a first roll angle variable is determined from an acquired rolling rate of the vehicle using a first method. At least a second roll angle variable is determined from one or more further vehicle movement dynamics characteristic variables. The roll angle is then calculated from the at least two roll angle variables which are determined.

Preferably the method according to an aspect of the invention is based on the idea to determine a roll angle of a vehicle, wherein the roll angle is calculated as a combination of at least a first roll angle variable and a second roll angle variable, wherein the first roll angle variable is determined from an acquired rolling rate of the vehicle using a first method, wherein the second roll angle variable is determined from one or more further vehicle movement dynamics characteristic variables using a second method.

It is preferred that the combination assures eliminating an offset and/or noise of the first roll angle variable and/or of the second roll angle variable.

It is preferred that the combination comprises multiple levels, wherein each level comprises at least one filtering step and at least one combination step.

It is particularly preferred that the combination comprises two levels, wherein the first level comprises four filtering steps, particularly two low pass filter and two high pass filter, and two combination steps, wherein the second level comprises two filtering steps, particularly one low pass filter and one high pass filter, and one combination step.

It is preferred that the first roll angle variable is fed to at least two filtering steps, particularly to at least two high pass filter and/or to two high pass filter.

It is preferred that the second roll angle variable is fed to at least two filtering steps, particularly to at least two low pass filter and/or to two low pass filter.

It is preferred that the number of levels is x, wherein the y-st level comprises $2^{(x-y+1)}$ filtering steps and $2^{(x-y)}$ combination steps, wherein the output of level y is the input of level y+1, wherein in particular in the y-st level $2^{(x-y)}$ cutoff frequencies are applied.

It is particularly preferred that y is the respective level of the total number of levels x.

It is preferred that the first roll angle variable has different characteristics than the second roll angle variable.

It is preferred that at least the first method provides roll angle values with particularly high accuracy for rapidly changing roll angle values.

It is preferred that at least the second method provides roll angle values with particularly high accuracy for steady roll angle values.

It is preferred that the second roll angle variable is determined from a yaw rate of the vehicle and a vehicle velocity.

It is preferred that the second roll angle variable is determined from a lateral acceleration and a vertical acceleration of the vehicle.

It is preferred that the vehicle is a motorcycle. Particularly compensation methods are applied fitted to motorcycle dynamics.

It is preferred that the vehicle is no airplane.

It is preferred that cross effects between angular rates due to the inclinations of the measurement system are eliminated based on the inertial measurement.

Particularly preferred the cross effect elimination is based on a pitch angle, wherein the pitch angle is estimated based on acceleration measurements.

Particularly preferred the pitch angle is estimated based on longitudinal acceleration which is fixed to the motorcycle and/or based on vertical acceleration which is fixed to the motorcycle and/or based on the overall acceleration of the motorcycle and/or based on the gravity.

Particularly preferred the cross effect elimination increases the accuracy of the roll rate and/or the accuracy of the yaw rate.

Particularly preferred the cross effect, elimination increases the precision of the first method determining the first roll angle variable and/or the precision of the second method determining the second roll angle variable.

It is preferred that one of the roll angle variable determination methods applies a resettable integrator in combination with a resettable high-pass filter to eliminate roll rate offset effects.

It is preferred that the first method applies an integrator for determining the first roll angle variable, wherein the integrator and subsequent filters, particularly direct subsequent high-pass filters, are resetted essentially simultaneous as soon as the output of the integrator reaches a predefined threshold.

It is preferred that one of the roll angle variable determination methods is using a compensation method to increase the precision of the calculation based on the vertical centrifugal acceleration. Particularly the compensation method is based on an estimated centrifugal force, wherein the estimation of the centrifugal force is based on the roll rate and/or on a radius, wherein the radius is essentially the distance between the tire contact point on the ground and a center of gravity of the motorcycle.

Particularly preferred the compensation method increases the accuracy of lateral acceleration based on a comparison of vertical acceleration and estimated centrifugal force.

Particularly preferred the compensation method increases the precision of the second method determining the second roll angle variable.

It is preferred that one of the roll angle variable determination methods is using a compensation method to increase the precision of the calculation based on the common effect of the lateral acceleration and the roll rate. Particularly the compensation method is based on an estimated rapid leaning force, wherein the estimation of the rapid leaning force is based on the derivative of the roll rate and/or a distance between the tire contact point on the ground and the mounting location of the lateral acceleration sensor.

Particularly preferred the compensation method increases the accuracy of lateral acceleration based on a comparison of lateral acceleration and estimated rapid leaning force.

Particularly preferred the compensation method increases the precision of the second method determining the second roll angle variable.

It is preferred that one of the roll angle variable determination methods is using a compensation method to increase the precision of the calculation by compensating the difference and/or discrepancy between the total roll angle and the physically active roll angle. Particularly the compensation method is based on a comparison between the vertical acceleration to the gravity and on the yaw rate.

Particularly preferred the compensation method increases the accuracy of lateral acceleration.

Particularly preferred the compensation method increases the precision of the second method determining the second roll angle variable.

It is preferred that the combination takes place in a frequency domain.

It is preferred that an amplitude of high frequencies of the first roll angle variable of the first method is weighted higher than an amplitude of high frequencies of the second roll angle variable of the second method It is preferred that an amplitude of low frequencies of the second roll angle variable of the second method is weighted higher than an amplitude of low frequencies of the first roll angle variable of the first method It is preferred that an amplitude of mid frequencies are weighted similarly.

It is preferred that a first combination combines the first roll angle variable high-passed filtered with a first cutoff frequency and the second roll angle variable low-passed filtered essentially with the first cutoff frequency.

It is preferred that a second combination combines the first roll angle variable high-passed filtered with a second cutoff frequency and the second roll angle variable low-passed filtered essentially with the second cutoff frequency.

It is preferred that a third combination combines a first combined roll angle variable, which is the result of the first combination, low-passed filtered with a third cutoff frequency and the second combined roll angle variable, which is the result of the second combination, high-passed filtered essentially with the third cutoff frequency.

It is preferred that the first, the second and the third cutoff-frequencies are different.

It is preferred that the first cut-off-frequency is in the range from approximately 0.01 Hz to approximately 0.50 Hz. Particularly preferred the first cut-off-frequency is essentially 0.1 Hz.

It is preferred that the second cut-off-frequency is in the range from approximately 0.1 Hz to approximately 10 Hz. Particularly preferred the second cut-off-frequency is essentially 2 Hz.

It is preferred that the third cut-off-frequency is in the range from approximately 0.05 Hz to approximately 2 Hz. Particularly preferred the third cut-off-frequency is essentially 0.2 Hz.

It is preferred that the third cutoff frequency lies between the first cutoff frequency and the second cutoff frequency.

According to one preferred embodiment of the method according to an aspect of the invention the combination is calculated by multiple levels of filtering and summing in order to improve noise cancellation and to reduce offset effects.

According to one preferred embodiment of the method according to an aspect of the invention the roll angle is calculated as a combination of roll angles calculated by methods providing roll angle variables with different properties.

According to one preferred embodiment of the method according to an aspect of the invention during the combination at least six filter operations (low-, high-, bandpass) are applied and at least three different cutoff frequencies are used.

According to one preferred embodiment of the method according to an aspect of the invention, the roll angle is calculated from the roll angle variables by addition.

Furthermore, it is preferred that the roll angle variables are filtered before the roll angle is calculated from them.

It is advantageous to filter the rolling rate with a high pass filter before it is used to calculate the first roll angle variable. This increases the fault tolerance of the method according to an aspect of the invention. It has proven particularly advantageous to use a high pass filter with a cut-off frequency of approximately 0.01 Hz for the filtering.

The rolling rate is preferably acquired by means of a rotational speed sensor which is mounted on the vehicle. The position of the rotational speed sensor on the motorcycle is not relevant since the rotational speeds on the entire vehicle are the same.

A first roll angle variable is preferably calculated from the rolling rate by integration over time. For small pitch angles, a rolling rate which is fixed to the motorcycle and a rolling rate which is fixed to the roadway closely resemble each other, and integration of the rolling rate which is fixed to the motorcycle results briefly in a roll angle variable which represents the roll angle.

According to one preferred embodiment of the method according to an aspect of the invention, the first roll angle variable is filtered with a high pass filter before it is used to calculate a roll angle. This reduces falsifications of the roll angle due to measurement errors of the rotational speed sensor. A high pass filter with a cut-off frequency of approximately 0.05 Hz is particularly preferably used.

Furthermore it is advantageous to filter the second roll angle variable with a low pass filter before it is used to calculate the roll angle since the relationships between the vehicle movement dynamics characteristic variables which form the basis of the determination of the second roll angle variable apply only in the case of steady-state cornering. A high pass filter with a cut-off frequency of approximately 0.05 Hz is particularly preferred.

The cut-off frequency of the low pass filter which is used to filter the second roll angle variable preferably has the same value, or approximately the same value, as the cut-off frequency of the high pass filter which is used to filter the first roll angle variable. This ensures uninterrupted determination of the roll angle over the entire frequency range. The cut-off frequency particularly preferably is in the range from approximately 0.01 Hz to approximately 0.10 Hz. The cut-off frequency which is used for the high pass filter and the low pass filter is quite particularly preferably 0.05 Hz. The lowest possible cut-off frequency is advantageously selected.

It is preferred that when more than two roll angle variables are added, the cut-off frequencies of the high pass filter, bandpass and filter low pass filter which are used are selected in such a way that the roll angle is determined over the entire frequency range.

According to one preferred embodiment of the method according to an aspect of the invention, the second roll angle variable is acquired either from the product of a yaw rate and a vehicle velocity, or from a yaw rate, a vehicle velocity and a vertical acceleration of the vehicle, or from a vertical acceleration of the vehicle, or from a vertical acceleration and a lateral acceleration of the vehicle. The yaw rate is particularly preferably determined by means of a rotational speed sensor. The vehicle velocity is particularly preferably determined from the measurement variables of at least one rotational speed sensor.

The roll angle variable or variables is/are preferably determined from the respective vehicle movement dynamics characteristic variable or variables on the basis of one or more characteristic curves which are stored in a control unit or at least one characteristic diagram which is stored in a control unit. When the second roll angle variable is acquired from the yaw rate and vehicle velocity, the determination is particularly preferably carried out by means of a characteristic diagram or a characteristic curve.

Alternatively, the second roll angle variable or variables is/are preferably calculated from the respective vehicle movement dynamics characteristic variable or variables on the basis of a calculation algorithm.

According to one preferred development of the method according to an aspect of the invention, two or more second roll angle variables are determined in different ways from the vehicle movement dynamics characteristic variables. These second roll angle variables which are determined in different ways are then used for plausibility checking of the roll angle. For the purpose of plausibility checking, the second roll angle variables which are determined in different ways and/or from different vehicle movement dynamics characteristic variables are particularly preferably compared with one another. Alternatively, a roll angle is respectively calculated from the first roll angle variable and one of the second roll angle variables, and these roll angles are compared with one another. Quite particularly preferably, at least one of the second roll angle variables is determined from at least one acceleration of the vehicle.

A malfunction of a sensor which is being used is preferably detected on the basis of the comparison of the second roll angle variables or roll angles which are determined in different ways. If the second roll angle variable which is calculated from the values of a sensor differs from the other roll angle variables, a malfunction of the sensor is possibly occurring. Rapid and simple detection of a faulty sensor is therefore possible. In this way, a fault in an acceleration sensor is particularly preferably detected.

It is likewise preferred to use the acquired acceleration values to determine an offset of the rotational speed sensor in order to determine the rolling rate.

A linearity fault of the rolling rate is advantageously determined using the offset which is determined in this way. Said linearity fault can then be used to correct the rolling rate and the accuracy of the method according to an aspect of the invention is therefore improved further.

The acceleration sensors are preferably also used to calculate the roll angle when the vehicle is stationary.

According to a further preferred embodiment of the method according to an aspect of the invention, the roll angle is calculated by weighted summing from the at least two roll angle variables which are determined, with the corresponding weighting parameters being adapted as a function of the current travel situation. The travel situation is detected here on the basis of at least one of the following variables: engine speed, engine torque, steering angle, vehicle velocity, vehicle acceleration, wheel speeds, state of the roadway, rolling rate, yaw rate, roll angle acceleration, yaw angle acceleration, roll angle, wheel slip, vehicle load, inclination of the roadway. The calculated roll angle is particularly preferably used, during the optimization of the weighting parameters, as an input variable for assessing the travel situation (iterative calculation of the roll angle).

In addition to the first roll angle variable which is determined from the rolling rate, a second roll angle variable is preferably determined from a vertical acceleration and a lateral acceleration of the vehicle, and a further second roll angle variable is determined from the product of a yaw rate and a vehicle velocity, and the roll angle is calculated from the three roll angle variables, in particular filtered with a high pass filter or low pass filter, by weighted summing with weighting parameters, the weighting parameters being adapted as a function of the current travel situation, which is detected on the basis of at least one of the following variables: engine speed, engine torque, steering angle, vehicle velocity, vehicle acceleration, wheel speeds, state of the roadway, rolling rate, yaw rate, roll angle acceleration, yaw angle acceleration, roll angle, wheel slip, vehicle load and inclination of the roadway.

It is likewise preferred for the properties of the filters which are used to filter the roll angle variables to be selected as a function of the current travel situation. The cut-off frequencies of the filters are particularly preferably selected as a function of the current travel situation.

The device according to an aspect of the invention is preferably based on the idea that an adding circuit is used to add at least two roll angle variables to form a roll angle, in which case a first roll angle variable is determined from a rolling rate of the vehicle, and a second roll angle variable is determined using at least one vehicle movement dynamics characteristic variable.

According to one development of the device according to an aspect of the invention, said device has at least one evaluation unit which contains an integrating circuit with which the first roll angle variable is determined from the rolling rate by integration.

The device according to an aspect of the invention advantageously comprises at least one evaluation unit with a high pass filter with which the first roll angle variable is filtered before it is used to calculate the roll angle.

Particularly preferred is the integrating circuit, with which the first roll angle variable is determined, designed as a resettable integration circuit.

Particularly preferred is at least one high pass filter, with which the first roll angle variable is filtered, designed as a resettable high pass filter.

More particularly preferred is the at least one high pass filter linked by a reset signal to the resettable integration circuit.

More particularly preferred the device comprises three evaluation units each with a high pass filter, wherein with the first high pass filter and with the second high pass filter the first roll angle variable is filtered, wherein with the third high pass filter a combination of the first roll angle variable and the second roll angle variable is filtered.

Furthermore, the device preferably comprises, in at least one evaluation unit, a low pass filter with which the second roll angle variable is also filtered before it is used to calculate the roll angle.

More particularly preferred the device comprises three evaluation units each with a low pass filter, wherein with the first low pass filter and with the second low pass filter the second roll angle variable is filtered, wherein with the third low pass filter a combination of the first roll angle variable and the second roll angle variable is filtered.

The low pass filter for filtering the second roll angle variable preferably has the same or approximately the same cut-off frequency as the high pass filter for filtering the first roll angle variable. As a result, uninterrupted determination of the roll angle is ensured over the entire frequency range during the subsequent addition of the roll angle variables.

According to one preferred embodiment of the device according to an aspect of the invention, at least one, particularly three, evaluation unit comprises a combination unit, wherein each combination unit combines two roll angle variables.

Particularly preferred the device comprises one evaluation unit e.g. a microprocessor and/or a microcontroller, wherein the evaluation unit is designed in such a way that it performs the required filtering and/or combinations and/or eliminations and/or compensations.

It is preferred that the device to determine the roll angle is designed as a sensor cluster or sensor system.

According to one preferred embodiment of the device according to an aspect of the invention, at least one evaluation unit comprises a circuit with which the second roll angle variable is determined from a yaw rate and a vehicle velocity, or from a yaw rate, a vehicle velocity and a vertical acceleration of the vehicle, or from a vertical acceleration of the vehicle, or from a vertical acceleration and a lateral acceleration of the vehicle.

According to one preferred embodiment of the device according to an aspect of the invention, at least one evaluation unit comprises a circuit with which cross effects between angular rates, e.g. due to the inclinations of the measurement system, are eliminated, particularly based on the inertial measurement.

According to one preferred embodiment of the device according to an aspect of the invention, at least one evaluation unit comprises a circuit with which a compensation method to increase the precision of the calculation based on the vertical centrifugal acceleration is performed.

According to one preferred embodiment of the device according to an aspect of the invention, at least one evaluation unit comprises a circuit with which a compensation method to increase the precision of the calculation based on the common effect of the lateral acceleration and the roll rate is performed.

According to one preferred embodiment of the device according to an aspect of the invention, at least one evaluation unit comprises a circuit with which a compensation method to increase the precision of the calculation by compensating the difference and/or discrepancy between the total roll angle and the physically active roll angle is performed. Particularly the compensation method is based on a comparison between the vertical acceleration to the gravity and on the yaw rate.

According to one preferred embodiment of the device according to an aspect of the invention, a y-st level comprises $2^{x-y+1}$ filters and $2^{x-y}$ combination units. Particularly the number of levels is at least 2 and/or is 2. Particularly preferred each levels comprises the same number of low pass filters as high pass filters.

The means for acquiring the rolling rate and/or the means for acquiring the yaw rate of the vehicle are/is preferably one or more rotational speed sensors. A rotational speed sensor or sensors which is/are already known within the scope of vehicle movement dynamics control systems in motor vehicles is/are particularly preferably used.

The means for acquiring the velocity of the vehicle is preferably at least one wheel speed sensor. Such a wheel speed sensor is usually already provided in the vehicle within the scope of an antilock brake system.

According to one preferred embodiment of the device according to an aspect of the invention, the means for acquiring at least one acceleration value is an acceleration sensor or a group of acceleration sensors. The sensor is particularly preferably a sensor of a vehicle movement dynamics control system, quite particularly preferably a sensor of an electronic stability program (ESP). Such sensors are technically mature and therefore can be used without additional development costs.

One advantage of an aspect of the invention is, that by using sensors which are already known in the prior art, cost-effective and at the same time accurate determination of the roll angle of the vehicle is possible.

An aspect of the invention also comprises the use of a method according to an aspect of the invention in at least one of the following systems: electronically controlled brake system, turning light system, chassis system, electrical steering system and vehicle movement dynamics control system.

BRIEF DESCRIPTION OF THE DRAWINGS

Further preferred exemplary embodiments of aspects of the invention emerge from the subclaims and from the subsequent description on the basis of figures, of which

DETAILED DESCRIPTION OF THE PREFERRED EMBODIMENTS

The core of the device or of the method for determining the roll angle (angle of inclination) of a vehicle, in particular a motorcycle, during driving is the combination of at least two individual calculation results (for steady-state travel and non-steady-state travel), in particular by means of a specific filter.

Figure 1:
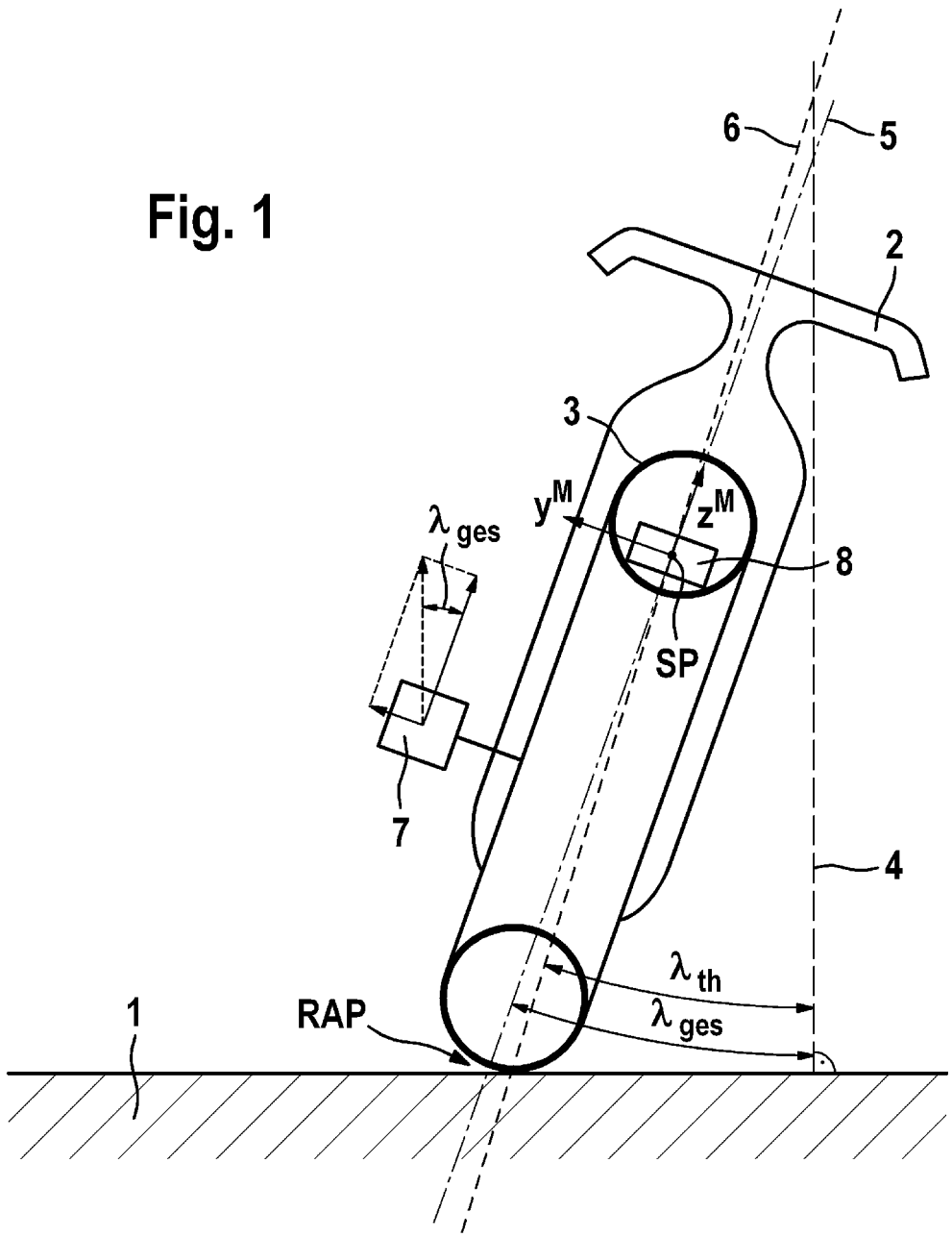
FIG. 1 is a schematic illustration of a motorcycle in a sloping position.

FIG. 1 is a schematic illustration of a number of variables which are relevant to the method according to an aspect of the invention. A motorcycle 2 travels in a sloping position on roadway 1. A tire 3 of the motorcycle 2 is illustrated in sectional form. Line 4 represents the direction of the perpendicular to the roadway, and line 5 represents the axis of symmetry of the motorcycle 5. At the center of gravity SP of the motorcycle 2, the coordinate system which is fixed to the motorcycle is indicated by the vertical axis $z^M$, which is fixed to the motorcycle and which runs parallel to the axis of symmetry of the motorcycle 5, and the transverse axis $y^M$, which is perpendicular thereto and is fixed to the motorcycle. Line 6 represents the connecting line, projected into the y/z plane, between the center of gravity SP of the motorcycle 2 and the wheel contact point or wheel contact line RAP. The total roll angle $\lambda_{ges}$ corresponds to the angle between the perpendicular 4 to the roadway and the plane 5 of symmetry of the vehicle, and the physically active roll angle $\lambda_{th}$ corresponds to the angle between the perpendicular 4 to the roadway and the line 6. By way of example, one or more sensors 7, for example a rolling rate sensor for determining the rolling rate $\dot{\lambda}^M$ which is fixed to the motorcycle and/or a yaw rate sensor for determining the yaw rate $\dot{\psi}^M$ which is fixed to the motorcycle, is/are arranged laterally on the motorcycle 2. Alternatively or additionally, one or more sensors or a sensor cluster 8 can be arranged on the motorcycle 2, in particular in the region of the center of gravity SP, these being, for example, a yaw rate sensor for determining the yaw rate $\dot{\psi}^M$ which is fixed to the motorcycle and/or acceleration sensor or sensors for determining the vertical acceleration $\ddot{z}^M$ which is fixed to the motorcycle and/or the lateral acceleration $\ddot{y}^M$ which is fixed to the motorcycle. The position of the rolling rate sensor and the position of the yaw rate sensor on the motorcycle 2 are advantageously not relevant.

In customary tires, the total roll angle $\lambda_{ges}$ is approximately 10% to 20% above the physically active roll angle $\lambda_{th}$. The difference between the total roll angle $\lambda_{ges}$ and the physically active roll angle $\lambda_{th}$ is also referred to as the additional roll angle $\lambda_{ZS}$. The following therefore applies:

$$\lambda_{ges} = \lambda_{ZS} + \lambda_{th} \quad (1)$$

In customary tires, the additional roll angle $\lambda_{ZS}$ which is conditioned by the width of the tire is, as has already been mentioned above, of the order of magnitude of approximately 10% to 20% of the physically active roll angle $\lambda_{th}$. Since $\lambda_{ZS}$ is small compared to $\lambda_{th}$, the total roll angle $\lambda_{ges}$ is often approximated by the physically active roll angle $\lambda_{th}$:

$$\lambda_{ges} \approx \lambda_{th}$$

For small pitch angles, the rolling rate $\dot{\lambda}^M$ which is fixed to the motorcycle and the rolling rate $\dot{\lambda}^{roadway}$ which is fixed to the roadway are similar to one another. Integration of the rolling rate $\dot{\lambda}^M$ gives rise to the (total) roll angle $\lambda_{ges}$ (this corresponds to the first roll angle variable $\lambda_1$ in the exemplary embodiments in FIGS. 2, 3 and 4).

Figure 2:
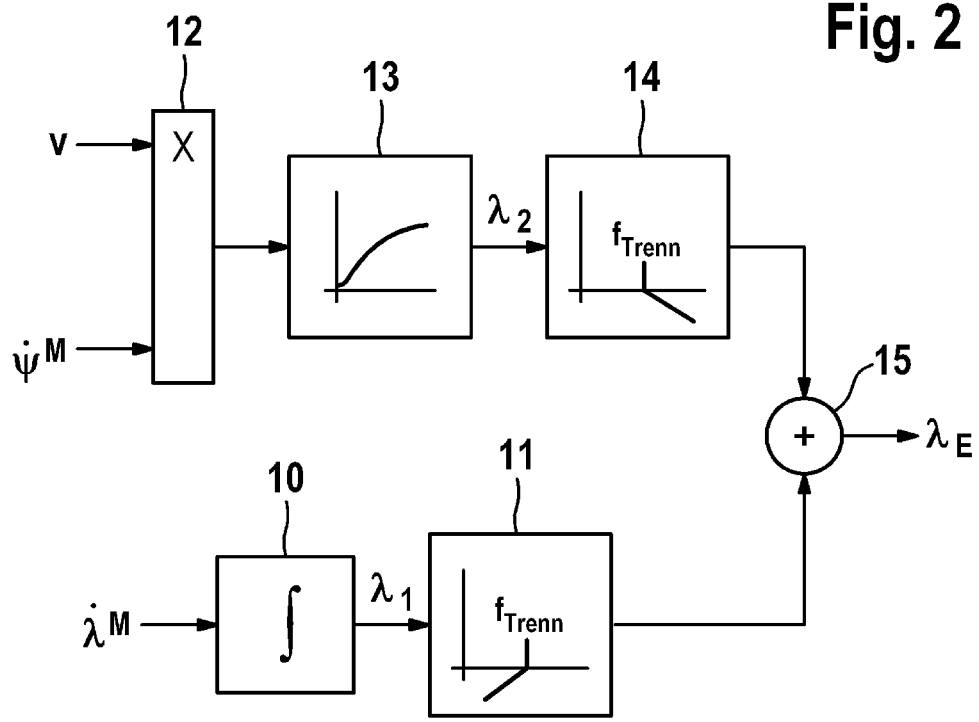
FIG. 2 is a schematic illustration of a first exemplary embodiment of a method according to an aspect of the invention.

A first exemplary embodiment of a method according to an aspect of the invention is illustrated schematically in FIG. 2. The integration 10 over time of the rolling rate $\dot{\lambda}^M$ which is fixed to the motorcycle is here a first calculation result (first roll angle variable $\lambda_1$). For example, the calculation result $\lambda_1$ is filtered with the high pass filter 11, which has, for example, a cut-off frequency $f_{Trenn}$ of 0.05 Hz. In the illustrated first exemplary embodiment, the second calculation result (second roll angle variable $\lambda_2$) is obtained as a function 13 of the product 12 of the yaw rate $\dot{\psi}^M$ which is fixed to the motorcycle and the velocity v of the motorcycle. For example, the calculation result $\lambda_2$ is filtered with the low pass filter 14, which has, for example, the same cut-off frequency $f_{Trenn}$ as the high pass filter 11, for example 0.05 Hz. In order to determine the roll angle $\lambda_E$ of the motorcycle, the calculation result $\lambda_1$ of the integration 10 over time of the rolling rate $\dot{\lambda}^M$ which is fixed to the motorcycle and the calculation result $\lambda_2$ is added to a function 13 of the product 12 of the yaw rate $\dot{\psi}^M$ which is fixed to the motorcycle and the velocity v (block 15).

The calculation of the first roll angle variable $\lambda_1$ by integration 10 of the rolling rate $\dot{\lambda}^M$ which is fixed to the motorcycle applies both to steady-state and to non-steady-state travel. However, the calculation by integration 10 of the measurement error of the rolling rate $\dot{\lambda}^M$ is not long-term stable, i.e. the result is valid only for a brief time. Depending on the design and accuracy of the rolling rate sensor used, the increase in the measurement error (referred to as drift) is between 1 degree/minute and 1 degree/second.

In order to avoid overflow errors during the integration 10, it is possible, according to an exemplary embodiment which is not illustrated, to transfer the functions of integration 10 and high pass filter 11 into an equivalent low pass filter with additional gain.

The calculation of the second roll angle variable $\lambda_2$ from the yaw rate $\dot{\psi}^M$ which is fixed to the motorcycle and the vehicle velocity v applies only to steady-state cornering. Function 13 is dependent on the tire geometry and the dynamic tire behavior of the motorcycle.

The filters 11, 14 used are usually first-order $PT_1$ elements. The cut-off frequency $f_{Trenn}$ is, for example, in the range from approximately 0.01 Hz to approximately 0.10 Hz.

The following explanation serves to substantiate the relationship between the yaw rate $\dot{\psi}^M$, vehicle velocity v and roll angle $\lambda$:

For steady-state cornering the following applies: the yaw rate $\dot{\psi}^M$ which is fixed to the motorcycle is provided by the yaw rate $\dot{\psi}^{roadway}$ which is fixed to the roadway and multiplied by the cosine of the total roll angle $\lambda_{ges}$, and by the pitch angle velocity $\dot{v}_{roadway}$, wherein, however, the pitch angle velocity $\dot{v}_{roadway}$ is zero for steady-state travel ($\dot{v}_{roadway}=0$), with the result that the second term sin $\lambda_g \cdot \dot{v}_{roadway}$ in equation (2) is eliminated:

$$\dot{\psi}^M = \cos \lambda_{ges} \cdot \dot{\psi}^{roadway} - \sin \lambda_{ges} \cdot \dot{v}_{roadway} = \cos \lambda_{ges} \cdot \dot{\psi}^{roadway} \quad (2)$$

For steady-state cornering, the following relationships also apply between the lateral acceleration $\ddot{y}^h$ in the horizontalized coordinate system (coordinate system which is rotated about the x axis with respect to the coordinate system which is fixed to the motorcycle, with the result that the horizontalized lateral acceleration $\ddot{y}^h$ extends parallel to the roadway), the vehicle velocity v, the yaw rate $\dot{\psi}_{roadway}$ which is fixed to the roadway, the tangent of the effective roll angle $\lambda_{th}$ and the gravitational acceleration g:

$$\ddot{y}^h = v \cdot \dot{\psi}^{roadway} \quad (3)$$

$$\tan\lambda_{th} = \frac{v \cdot \dot{\psi}^{roadway}}{g} \quad (4)$$

Insertion of (2) into (4) provides:

$$\tan\lambda_{th} = \frac{v \cdot \dot{\psi}^{roadway}}{g} = \frac{v \cdot \dot{\psi}^M}{\cos\lambda_{ges} \cdot g} \quad (5)$$

$$\sin\lambda_{th} \cdot \frac{\cos\lambda_{ges}}{\cos\lambda_{th}} = \frac{v \cdot \dot{\psi}^M}{g} \quad (6a)$$

Assuming that $\lambda_{ges} = \lambda_{th}$, this can also be simplified to yield:

$$\sin\lambda_{th} \approx \frac{v \cdot \dot{\psi}^M}{g} \quad (6b)$$

Therefore, the roll angle $\lambda_{th}$ is a function f of the product $\dot{\psi}^M \cdot v$ of the yaw rate $\dot{\psi}^M$ which is fixed to the motorcycle and the velocity v of the motorcycle:

$$f(\lambda_{th}) = \frac{\dot{\psi}^M \cdot v}{g} \quad (7)$$

The functional relationship $f(\lambda_{th})$ or the above equation (7) cannot be solved in a closed fashion. For this reason, a numerically acquired characteristic curve is used (block 13) in order to determine the roll angle $\lambda_{th}$ (according to the exemplary embodiment illustrated in FIG. 2 the roll angle variable $\lambda_2$) from the product (block 12) of the yaw rate $\dot{\psi}_M$ which is fixed to the motorcycle and the velocity v.

Figure 3:
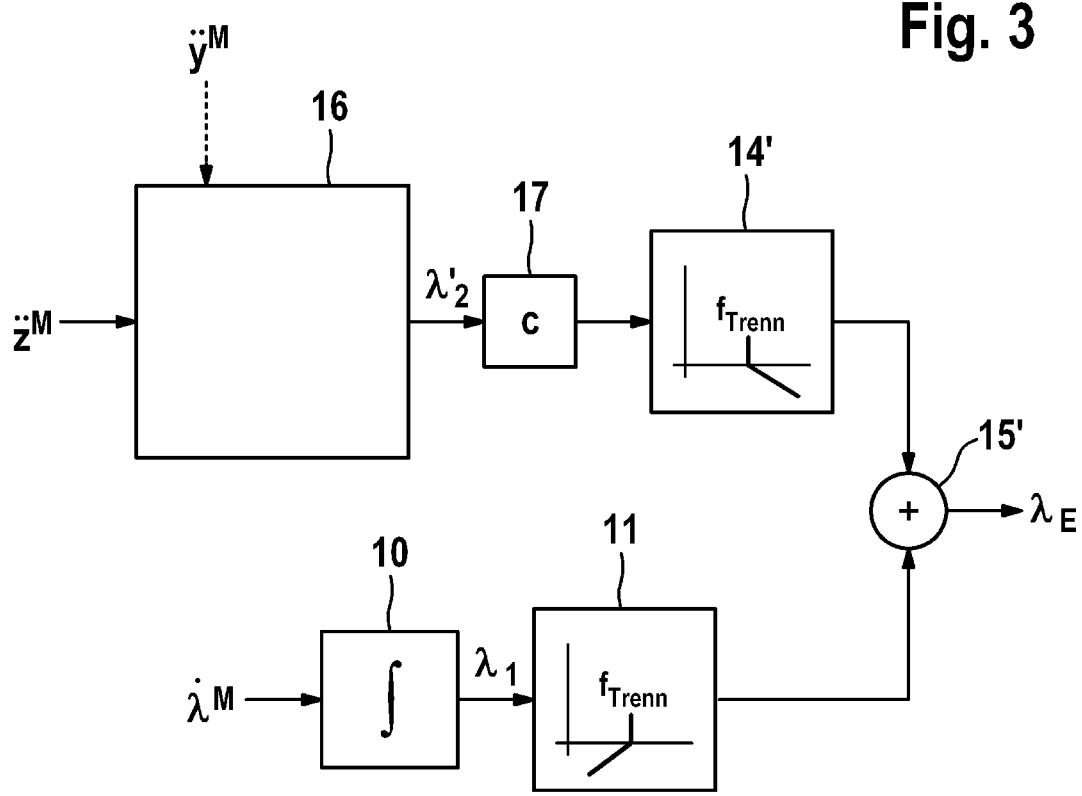
FIG. 3 is a schematic illustration of a second exemplary embodiment of a method according to an aspect of the invention.

FIG. 3 is a schematic illustration of a second exemplary embodiment of a method according to an aspect of the invention. In this exemplary embodiment also, the integration 10 over time of the rolling rate $\dot{\lambda}^M$ which is fixed to the motorcycle is the first calculation result (the first roll angle variable $\lambda_1$), and here too the first roll angle variable $\lambda_1$ is filtered, for example, with a high pass filter 11, with, for example, a cut-off frequency $f_{Trenn}$ of 0.05 Hz. The explanation and alternative ways of calculating the first roll angle variable $\lambda_1$ which are given further above within the scope of the first exemplary embodiment apply here correspondingly. In contrast to the first exemplary embodiment, in the second exemplary embodiment the second calculation result (the second roll angle variable $\lambda_2'$) is determined essentially from the acceleration, fixed to the motorcycle, in the z direction $\ddot{z}^M$ (block 16). In order to take into account the width of the tire, the second roll angle variable $\lambda_2'$ in block 17 can be multiplied by an empirical factor c. In the second exemplary embodiment of the method according to an aspect of the invention, the second calculation result $\lambda_2'$ is also filtered with a low pass filter 14' with, for example, the same cut-off frequency $f_{Trenn}$ as that of the high pass filter 11, this being for example 0.05 Hz. In order to determine the roll angle $\lambda_E$ of the motorcycle, the calculation result $\lambda_1$ of the integration 10 over time of the rolling rate $\dot{\lambda}_M$ which is fixed to the motorcycle and the calculation result $\lambda_2'$ are added to the determination of a roll angle variable from an acceleration, fixed to the motorcycle, in the z direction $\ddot{z}^M$ (block 15').

The filters 11, 14' used are customarily first-order $PT_1$ elements. The cut-off frequency $f_{Trenn}$ is, for example, in the range from approximately 0.01 Hz to approximately 0.10 Hz.

The calculation of the second roll angle variable $\lambda_2'$ from an acceleration which is fixed to the motorcycle in the z direction $\ddot{z}^M$ applies only to steady-state cornering. Furthermore, if the factor c is not taken into account (c=1), it is based on the assumption of ideally narrow tires. Furthermore, the acceleration, fixed to the motorcycle, in the z direction $\ddot{z}^M$ is not subject to a sign, with the result that a further information item, for example the acceleration, fixed to the motorcycle, in the y direction $\ddot{y}_M$, can be used to define the correct sign of the roll angle $\lambda$.

The following explanation serves to substantiate the relationship between the acceleration, fixed to the motorcycle, in the z direction $\ddot{z}^M$ and the roll angle $\lambda$:

For steady-state cornering the physically active roll angle $\lambda_{th}$ is provided by the arc cosine of the quotient of the gravitational acceleration g with respect to the vertical acceleration $\ddot{z}^M$ which is fixed to the motorcycle:

$$\lambda_{th} = \arccos\frac{g}{\ddot{z}^M} \qquad (8)$$

In order to define the correct sign, the lateral acceleration $\ddot{y}^M$ which is fixed to the motorcycle can be used:

$$\lambda_{th} = \arccos\left(\left|\frac{g}{\ddot{z}^M}\right|\right) \cdot (-1) \cdot \text{sign}(\ddot{y}^M) \qquad (9)$$

Here, sign(X) is the sign function which has the value "1" if X is greater than zero, which is "0" if X is equal to zero, and which is "−1" if X is less than zero.

As already mentioned above, the total roll angle $\lambda_{ges}$ can be approximated by the physically active roll angle $\lambda_{th}$:

$$\lambda_{ges} \approx \lambda_{th}$$

For example, the second roll angle variable $\lambda_2'$ is determined according to the equation (9) (block 16).

Figure 4:
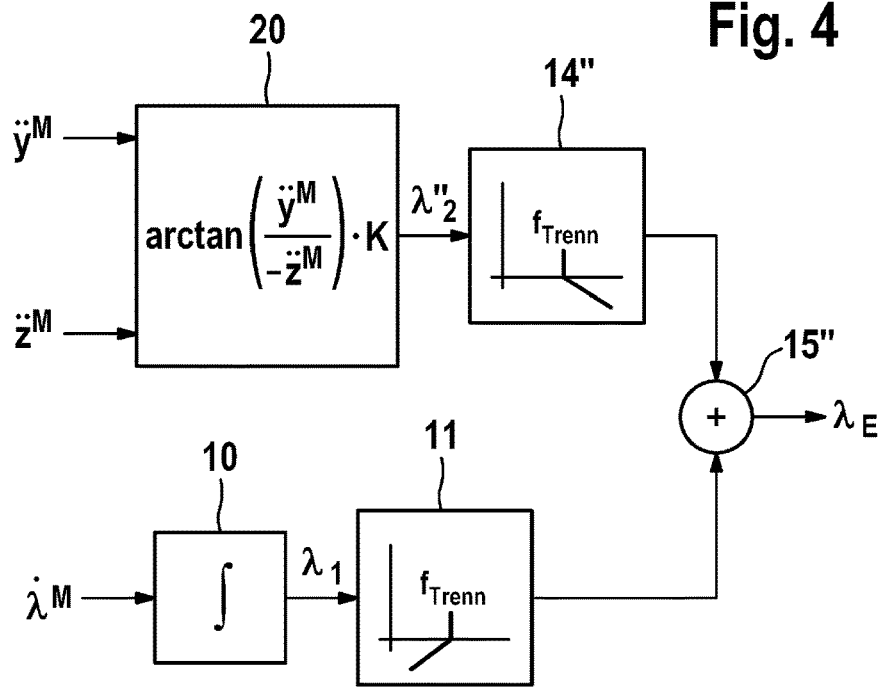
FIG. 4 is a schematic illustration of a third exemplary embodiment of a method according to an aspect of the invention.

A third exemplary embodiment of a method according to an aspect of the invention is illustrated schematically in FIG. 4. In this exemplary embodiment, the integration 10 over time of the rolling rate $\dot{\lambda}^M$ which is fixed to the motorcycle is also the first calculation result (the first roll angle variable $\lambda_1$), and for example the first roll angle variable $\lambda_1$ is also filtered here with a high pass filter 11 with, for example, a cut-off frequency $f_{Trenn}$ of 0.05 Hz. The explanation and alternatives for the calculation of the first roll angle variable $\lambda_1$ which are given above within the scope of the first exemplary embodiment apply here correspondingly. In contrast to the first exemplary embodiment, in the third exemplary embodiment the second calculation result (the second roll angle variable $\lambda_2''$) is determined from two acceleration values which are fixed to the motorcycle, in particular an acceleration, fixed to the motorcycle, in the z direction $\ddot{z}^M$ and an acceleration, fixed to the motorcycle, in the y direction $\ddot{y}^M$ (block 20). The second calculation result $\lambda_2''$ is filtered with a low pass filter 14'' with, for example, the same cut-off frequency $f_{Trenn}$ as that of the high pass filter 11, this being, for example 0.05 Hz. In order to determine the roll angle $\lambda_E$ of the motorcycle, the calculation result $\lambda_1$ of the integration 10 over time of the rolling rate $\dot{\lambda}_M$ which is fixed to the motorcycle and the calculation result $\lambda_2''$ is added to the determination of a roll angle variable from two acceleration values which are fixed to the motorcycle, for example a vertical acceleration $\ddot{z}^M$ which is fixed to the motorcycle and a lateral acceleration $\ddot{y}^M$ which is fixed to the motorcycle (block 15'').

The filters 11, 14'' used are customarily first-order $PT_1$ elements. The cut-off frequency $f_{Trenn}$ is, for example, in the range from approximately 0.01 Hz to approximately 0.10 Hz.

The calculation of the second roll angle variable $\lambda_2''$ from an acceleration, fixed to the motorcycle, in the z direction $\ddot{z}^M$ and an acceleration, fixed to the motorcycle, in the y direction $\ddot{y}^M$ applies only to steady-state cornering. The calculation includes the geometry of the tire and the dynamic tire behavior of the motorcycle.

The following explanation serves to substantiate the relationship between the acceleration, fixed to the motorcycle, in the z direction $\ddot{z}^M$, the acceleration, fixed to the motorcycle, in the y direction $\ddot{y}^M$ and the roll angle $\lambda$:

As already mentioned above, the following relationship applies:

$$\lambda_{ges} = \lambda_{ZS} + \lambda_{th} \qquad (10)$$

According to equation (8), for steady-state cornering the physically active roll angle $\lambda_{th}$ is provided by the arc cosine of the quotient of the gravitational acceleration g with respect to the vertical acceleration $\ddot{z}^M$ which is fixed to the motorcycle:

$$\lambda_{th} = \arccos\left(\frac{g}{\ddot{z}^M}\right) \qquad (11)$$

Furthermore, for steady-state cornering the additional roll angle $\lambda_{ZS}$ is given by the arc tangent of the quotient of the lateral acceleration $\ddot{y}^M$ which is fixed to the motorcycle with respect to the vertical acceleration $\ddot{z}^M$ which is fixed to the motorcycle:

$$\lambda_{ZS} = \arctan\left(\frac{\ddot{y}^M}{-\ddot{z}^M}\right) \qquad (12)$$

Insertion of equations (11) and (12) into (10) provides:

$$\lambda_{ges} = \arccos\left(\frac{g}{\ddot{z}^M}\right) + \arctan\left(\frac{\ddot{y}^M}{-\ddot{z}^M}\right) \qquad (13)$$

For example, the total roll angle $\lambda_{ges}$ is approximated as a multiple k of the additional roll angle $\lambda_{ZS}$ which is conditioned by the width of the tire. It is therefore calculated according to the following relationship (block 20):

$$\lambda_{ges} = k \cdot \arctan\left(\frac{\ddot{y}^M}{-\ddot{z}^M}\right) \qquad (14)$$

Here, the factor k is dependent on the geometry of the tire and the dynamic tire behavior of the motorcycle. An exemplary value is k=9.7.

An advantage of the method according to an aspect of the invention is that the roll angle $\lambda_E$ of the motorcycle is without time delay, apart from the time delays caused by the sensors. The roll angle $\lambda_E$ can be determined both under steady-state and non-steady-state travel conditions. Furthermore, the accuracy of the roll angle which is determined by a combination of two calculation methods is higher than is possible with an individual measuring method.

The integration of the rolling rate over time is in itself not suitable as a method for acquiring a roll angle. Owing to the measuring error which increases with time, this method cannot be applied directly with a standard sensor system.

A further advantage is that the manufacturing costs of a device for implementing the method according to an aspect of the invention are significantly lower than a highly accurate inertial sensor system, whilst having the same level of accuracy.

Compared to the first exemplary embodiment (FIG. 2) with a determination of the roll angle from two rotational speed signals (rolling rate $\dot{\lambda}^M$ and yaw rate $\dot{\psi}_M$), the manufacturing costs of the device for determining the roll angle according to the second and third exemplary embodiments from the rolling rate $\dot{\lambda}_M$, and one acceleration valve $\ddot{z}^M$ or two acceleration values $\ddot{z}^M$, $\ddot{y}^M$, are considerably reduced. Use of a sensor cluster, which is already known, for example, from the use in electronic stability programs (ESP)

in passenger cars, is appropriate. Such a sensor cluster customarily provides a rotational speed signal and one or two acceleration signals. Such a sensor cluster can, if appropriate, be installed rotated through 90 degrees.

If the results of the integration 10 over time of the rolling rate $\dot{\lambda}_M$ which is fixed to the motorcycle and the function 13 of the product 12 of the yaw rate if $\dot{\psi}_M$ which is fixed to the motorcycle and the velocity v of the motorcycle (first exemplary embodiment) are combined, it is advantageous that the position of the sensor system on the motorcycle is not relevant since the rotational speeds on the entire vehicle are the same.

Figure 5:
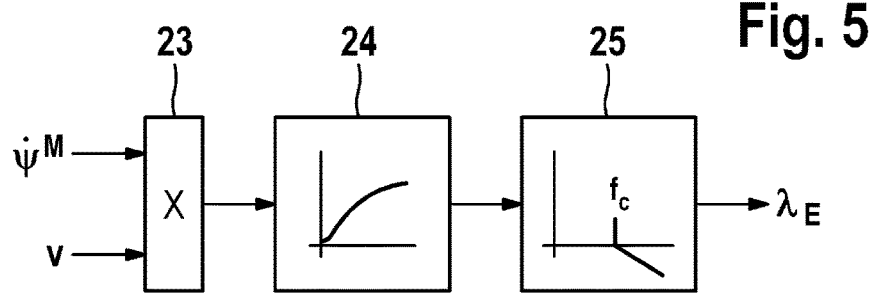
FIG. 5 is a schematic illustration of an exemplary method for determining a roll angle.

An aspect of the invention also relates to a method for determining the roll angle of a motor cycle during travel from the product of the yaw rate $\dot{\psi}_M$ which is fixed to the motorcycle and the velocity of the motorcycle. FIG. 5 is a schematic illustration of a corresponding exemplary embodiment. The product is formed from a yaw rate which is fixed to the motorcycle and the velocity v of the motorcycle (block 23). A roll angle variable is determined from the product by means of a functional relationship, which is predefined for example in the form of a characteristic curve (block 24). After the calculation result has been filtered with a low pass filter 25, the roll angle $\lambda_E$ of the motorcycle is obtained.

The filter 25 is usually a first-order $PT_1$ element. The cut-off frequency is, for example, in the region of approximately 1 Hz.

According to an exemplary embodiment, not illustrated, a combination of a plurality of filters is used in order to reduce the signal peaks during rapid slalom travel: a low pass filter (cut-off frequency of approximately 0.05 Hz), a high pass filter (cut-off frequency of approximately 0.05 Hz, gain factor of 0.5), addition of the two signals and possibly further filtering with a low pass filter (cut-off frequency of approximately 1 Hz) in order to smooth the signals. According to the above explanations (equations (2) to (7)), the roll angle $\lambda$ is a function f of the product $\dot{\psi}_M \cdot v$ of the yaw rate $\dot{\psi}_M$ which is fixed to the motorcycle and the velocity v of the motorcycle (see equation (7)). A numerically acquired characteristic curve is used (block 24) to determine the roll angle $\lambda$ from the product (block 23) of the yaw rate $\dot{\psi}_M$ which is fixed to the motor cycle and the velocity v.

The manufacturing costs of the device for implementing the method (determination of the roll angle from the product of the yaw rate which is fixed to the motorcycle and the velocity) are considerably lower compared to those for a highly accurate inertial sensor system while the accuracy is the same. The position of the sensor system on the motorcycle is not relevant since the rotational speed is the same over the entire vehicle.

Methods for determining a roll angle on the basis of acceleration measurement ($\ddot{z}^M$ or $\ddot{z}^M$, $\ddot{y}^M$) and a measurement of the rolling rate $\dot{\lambda}_M$ are described above. The fault tolerance of these methods can be increased by filtering the rolling rate $\dot{\lambda}_M$ with a first-order high pass filter, for example with a cut-off frequency of approximately 0.01 Hz.

An aspect of the invention also relates to a method for checking the plausibility of the measured value of a roll angle-determining algorithm. In order to check the plausibility of the method, the roll angle can be determined for the steady-state travel condition, i.e. the second roll angle variable, redundantly using different methods. For example, a roll angle variable $\lambda_2$ and, respectively, $\lambda_2''$ can be determined from the yaw rate $\dot{\psi}_M$ which is fixed to the motorcycle and the velocity v as well as from the vertical acceleration $\ddot{z}^M$ which is fixed to the motorcycle and the lateral acceleration $\ddot{y}^M$ which is fixed to the motorcycle.

Any selection of two or more roll angle-determining methods is conceivable. The trustworthiness of the roll angle $\lambda_E$ which is determined by means of the roll angle variable or variables can be estimated by comparing the results.

Furthermore, under certain circumstances a sensor fault can be detected by the plausibility checking/the comparison. If there is a considerable difference between the roll angle variables $\lambda_2$, $\lambda_2'$, $\lambda_2''$ which are determined in a variety of ways it is possible to infer a malfunction of one of the acceleration sensors or rotational speed sensors.

If the acceleration sensors which are present measure constant values over a specific time period, the rolling rate $\dot{\lambda}_M$ must be zero in this time period. An offset of the rolling rate sensor can therefore be determined and compensated.

Between any two travel conditions with a roll angle of zero degrees, the integral of the rolling rate $\dot{\lambda}_M$ is zero degrees. Given a known offset of the rolling rate sensor, the linearity fault of the rolling rate sensor can be determined by means of this condition.

Systems which are critical in terms of safety require information about the reliability of the roll angle signal. This reliability can be determined on the basis of the described method for the purpose of plausibility checking.

A traveling motorcycle must always be in a position of equilibrium. This is necessary both for straight-ahead travel and for cornering. The position of equilibrium of the motorcycle is dependent on a large number of different factors, for example the vehicle velocity v, the coefficient of friction between the tire and roadway, the wheel speeds $\omega_I$ (i=1 or 2 for the front wheel or rear wheel), the engine speed, the steering angle, the vehicle load, the inclination of the roadway, etc. These factors influence the equilibrium values for the rolling rate $\dot{\lambda}_M$, the yaw rate $\dot{\psi}_M$ and the three components of the vehicle acceleration $\ddot{x}^M$, $\ddot{y}^M$ and $\ddot{z}^M$.

Figure 6:
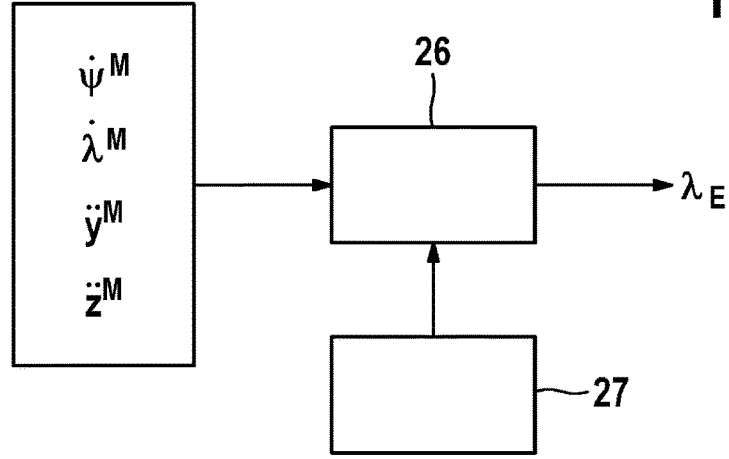
FIG. 6 is a schematic illustration of a fourth exemplary embodiment of a method according to an aspect of the invention.

FIG. 6 is a schematic illustration of a fourth exemplary embodiment of a method according to an aspect of the invention. The algorithm according to the example for the calculation 26 of the roll angle $\lambda_E$ is based on the measurements of the values for the yaw rate $\dot{\psi}_M$, the rolling rate $\dot{\lambda}_M$, the acceleration, fixed to the motorcycle, in the $\ddot{z}^M$ direction and the acceleration, fixed to the motorcycle, in the y direction $\ddot{y}^M$ with corresponding sensors. In order to ensure a high level of accuracy, the algorithm must change adaptively as a function of the travel situation. In order to make this possible, it is necessary also to use the information from a plurality of vehicle systems (vehicle sensors), to estimate the current travel situation and to adapt the algorithm for the calculation 26 of the roll angle $\lambda_E$ in accordance with the travel situation. For this purpose, in block 27 the current travel situation is estimated on the basis of one or more of the following variables: engine speed, engine torque, steering angle, vehicle velocity v, vehicle acceleration, wheel speeds $\omega_i$, state of the roadway, wheel slip, vehicle load, inclination of the roadway. This estimation is then included in the calculation 26 of the roll angle $\lambda_E$.

It is also necessary to take into account the fact that the theoretical roll angle $\lambda_{th}$ and the total roll angle $\lambda_{ges}$ differ since the width of the tire is not equal to zero.

Figure 7:
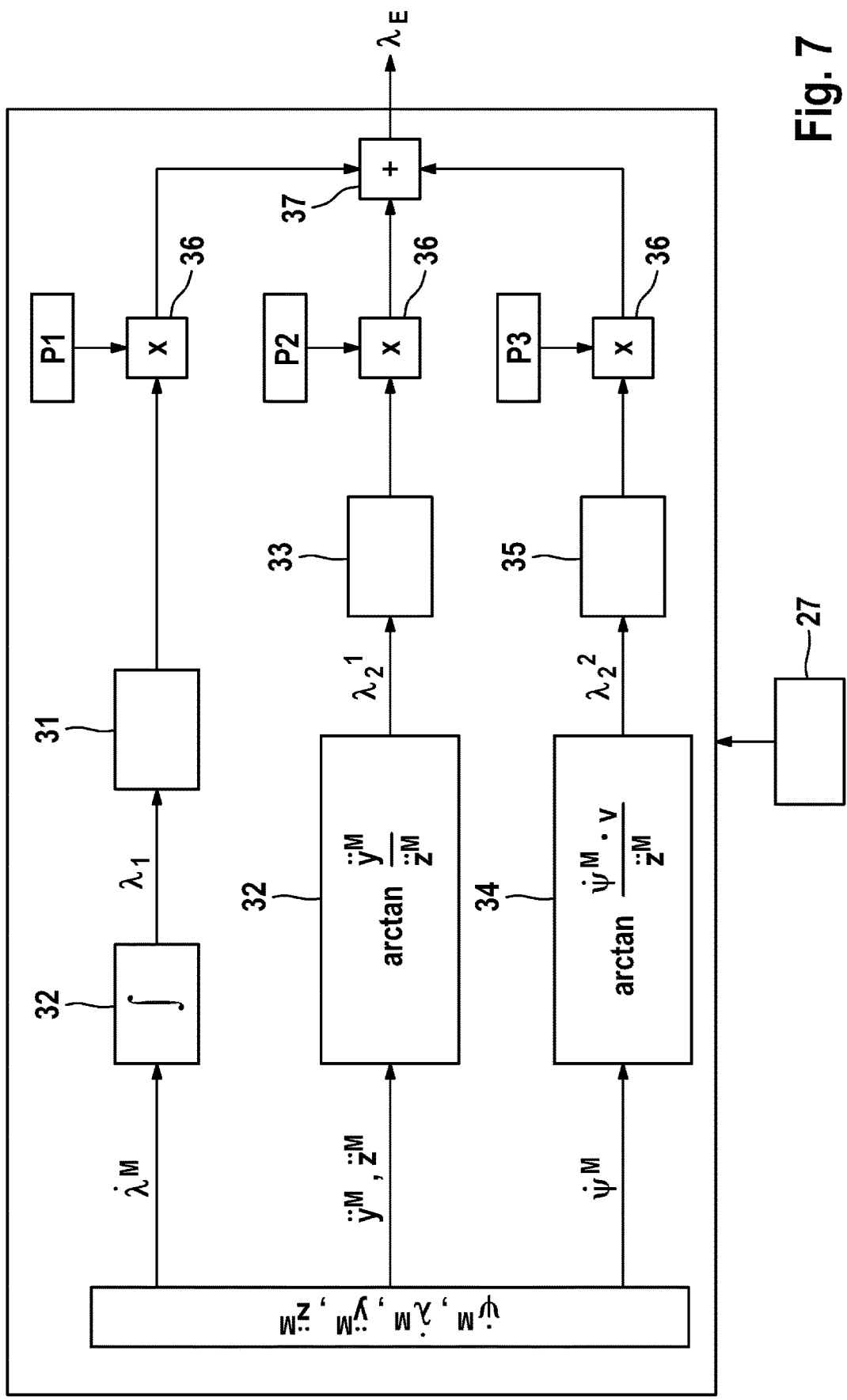
FIG. 7 is a schematic illustration of an exemplary method for adaptive calculation of a roll angle for use in the fourth exemplary embodiment illustrated in FIG. 7.

FIG. 7 is a schematic illustration of an exemplary method for adaptively calculating a roll angle $\lambda_E$. In order to ensure a high degree of accuracy, a combination of various methods is used to calculate the roll angle $\lambda_E$. At the same time, measurements of the rolling rate $\dot{\lambda}_M$, of the yaw rate $\dot{\psi}_M$ and of the accelerations in the z and y direction $\ddot{z}^M$, $\ddot{y}^M$ are carried out, for example with a sensor cluster. The integral 30 of the rolling rate $\dot{\lambda}_M$ is formed, and the result $\lambda_1$ is filtered with a high pass filter 31. Furthermore, in block 32 the arc tangent of the quotient of the acceleration in the y direction $\ddot{y}^M$ is calculated with respect to the acceleration in the z direction $\ddot{z}^M$, and the result $\lambda_2^1$ is filtered with a low pass filter 33. Likewise, in block 34 the arc tangent of the quotient of the product of the yaw rate $\dot{\psi}_M$ times the vehicle acceleration v is calculated to form the acceleration in the z direction $\ddot{z}^M$, and the result $\lambda_2^2$ is filtered with a low pass filter 35. The three results are multiplied by corresponding weighting parameters P1, P2 and P3 (blocks 36) and summed (block 37).

Properties of the system (for example filter properties) such as, for example, the cut-off frequencies of the individual filters 31, 33, 35 and/or the weighting parameters P1, P2, P3 are changed as a function of the current travel situation 27 which is detected by means of at least one of the abovementioned variables, for example the vehicle velocity v, wheel slip, wheel speeds $\omega_i$, engine speeds, steering angle, vehicle load, inclination of the roadway, rolling rate $\dot{\lambda}_M$, yaw raw $\dot{\psi}_M$, roll angle acceleration, yaw angle acceleration, and roll angle $\lambda_E$ (previously calculated, for example). The dependence of the system properties, for example the dependence of the cut-off frequencies of the filters and the dependence of the weighting parameters P1, P2, P3, on these variables are determined empirically or theoretically, stored in a control unit in the form of characteristic curves or characteristic diagrams or calculation rules and taken into account in the calculation of the roll angle. The system can be adapted for any travel situation and the roll angle $\lambda_E$ of the vehicle can be determined accurately by automatically changing the parameters (on the basis of the stored characteristic curves, characteristic diagrams or calculation algorithms).

Figure 8:
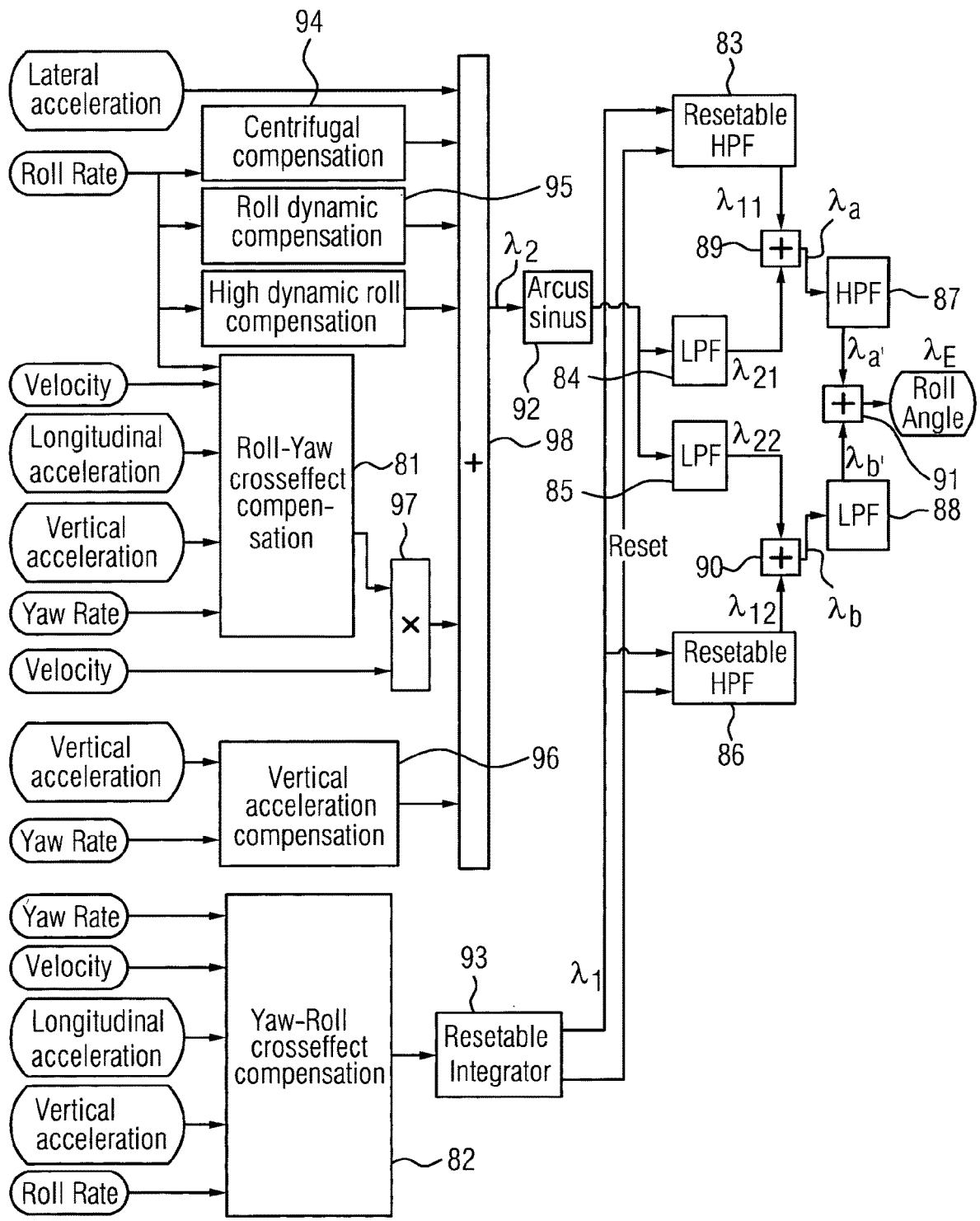
FIG. 8 is a schematic illustration of an exemplary method for adaptive calculation of a roll angle.

FIG. 8 is a schematic illustration of an exemplary method for adaptive determining a roll angle $\lambda_E$. In order to ensure high degree of accuracy, a combination of various methods is used to calculate the roll angle $\lambda_E$.

The roll angle $\lambda_E$ is determined based on a first roll angle variable $\lambda_1$ and based on a second roll angle variable $\lambda_2$.

Subsequently an exemplary method for determining the roll angle $\lambda_E$ based on the first and the second roll angle variables $\lambda_1$, $\lambda_2$ will be described. The method takes place in a frequency domain.

A first high-pass filter 83 filters the first roll angle variable $\lambda_1$ with a first cutoff frequency, which results in a filtered first roll angle variable $\lambda_{11}$. A second high-pass filter 86 filters the first roll angle variable $\lambda_1$ with a second cutoff frequency, which results in a filtered second roll angle variable $\lambda_{12}$.

A first low-pass filter 84 filters the second roll angle variable $\lambda_2$ with a first cutoff frequency, which results in a filtered third roll angle variable $\lambda_{21}$. A second low-pass filter 85 filters the second roll angle variable $\lambda_2$ with a second cutoff frequency, which results in a filtered fourth roll angle variable $\lambda_{22}$. Arcus sinus function 92 is executed before the low pass filters 84, 85.

A first combination 89 combines the filtered first roll angle variable $\lambda_{11}$ and the filtered third roll angle variable $\lambda_{21}$ which results in a first combined roll angle variable $\lambda_a$.

A second combination 90 combines the filtered second roll angle variable $\lambda_{12}$ and the filtered fourth roll angle variable $\lambda_{22}$ which results in a second combined roll angle variable $\lambda_b$.

A third high-pass-filter 87 filters the first combined roll angle variable $\lambda_a$ with a third cutoff frequency. A third low-pass filter 88 filters the second combined roll angle variable $\lambda_b$ with a third cutoff frequency.

The first cutoff frequency is lower than the third cutoff frequency and the third cutoff frequency is lower than the second cutoff frequency.

A third combination 91 combines the filtered first combined roll angle variable $\lambda_a'$ and the filtered second combined roll angle variable $\lambda_b'$, which results in the roll angle $\lambda_E$.

Particularly the combination takes place in a frequency domain and the amplitudes are added.

Due to an offset error of the roll rate sensor, an integration obtaining the first roll angle variable $\lambda_1$ will result in a ramp function, why an overflow will appear at some point in the integrator 93. In order to circumvent such an overflow the integrator 93 will be resetted, as soon as the output value of the integrator 93 reaches a certain positive, respectively negative threshold. Particularly, when resetting, the certain positive, respectively negative threshold may be subtracted, respectively added, to the output value. A jump in the output value due to the reset or an overflow of the integrator 93 may usually be propagated to the first high-pass filter 83 and to the second high-pass filter 86 and be detectable at the output of the first high-pass filter 83 and at the output of the second high-pass filter 86. In order to circumvent the detectable jump in the output of the first high-pass filter 83 and in the output of the second high-pass filter 86, both high-pass filter 83, 86 may be resetted at the same time as the integrator 93. To do so both high-pass filters 83, 86 may be synchronized with the integrator 93. Particularly all previous stored input states of the integrator 93, the first high-pass filter 83 and the second high-pass filter 86 are resetted to zero. Particularly all previous stored output states of the integrator 93, the first high-pass filter 83 and the second high-pass filter 86 are resetted to zero.

Due to synchronized resetting the integrator 93 and the first and the second high-pass filter 83, 86 an overflow, particularly an overflow of the integrator 93, does not affect the output of the first and/or the second high-pass filter 83, 86.

Figure 10:
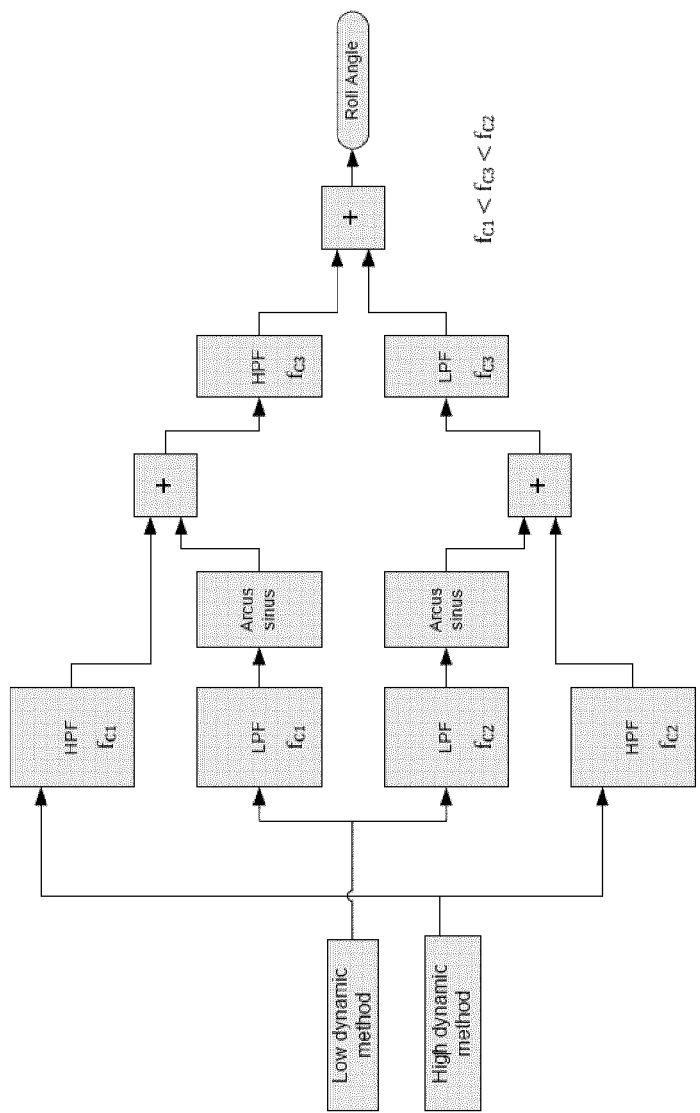
FIG. 10 is a schematic illustration of an exemplary method of a combination.

In the exemplary method the low-pass filters comprise an arcsin-function. The arcsin functions are applied on the signals filtered by the low pass filters having very low cut-off frequencies to avoid clipping due to the high noise coming from the low dynamic method, which is shown in FIG. 10. Apart from this the combination method shown in FIG. 10 corresponds to the combination method shown in FIG. 8.

There is a cross effect between angular rates due to inclinations of the measurement system. For example, if a pitch angle α of the motorcycle does not equal zero, the yaw rate sensor measures a portion of the roll rate $\dot{\lambda}_{roadway}$ which is fixed to the roadway and vice versa the roll rate sensor measures a portion of the yaw rate $\dot{\psi}_{roadway}$ which is fixed to the roadway. This is particularly the case when the motorcycle moves on a circular path. This cross effect can be eliminated based on inertial measurement. Particularly the pitch angle α is not zero, because the sensor cluster is not mounted horizontally on the motorcycle with regard to the roadway 1 and/or because of heavy weight on the motorcycle causing the rear suspension to be pushed down.

Algorithm 81 corrects the yaw rate $\dot{\psi}^M$ which is fixed to the motorcycle by eliminating the erroneous roll rate portion $\dot{\lambda}^{roadway}$. The erroneous roll rate portion $\dot{\lambda}^{roadway}$ corresponds to this cross effect.

Algorithm 97 (a multiplication) determines the roll angle on the basis of the corrected yaw rate (algorithm 81) and the velocity (corresponding to block 23 of FIG. 5).

Algorithm 82 corrects the roll rate $\dot{\lambda}^M$ which is fixed to the motorcycle by eliminating the erroneous yaw rate portion $\tilde{\dot{\psi}}^{roadway}$. The erroneous yaw rate portion $\tilde{\dot{\psi}}^{roadway}$ corresponds to this cross effect.

In order to eliminate these cross effects the pitch angle α has to be estimated.

Algorithm 81 and algorithm 82 estimate the pitch angle α based on longitudinal acceleration $\ddot{x}^M$ which is fixed to the motorcycle and/or based on vertical acceleration $\ddot{z}^M$ which is fixed to the motorcycle and/or based on the overall acceleration of the motorcycle $\dot{v}$ and/or based on the gravity g. Alternatively solely one of these algorithms estimates the pitch angle α and the other algorithm is provided with the estimated pitch angle α.

Figure 9:
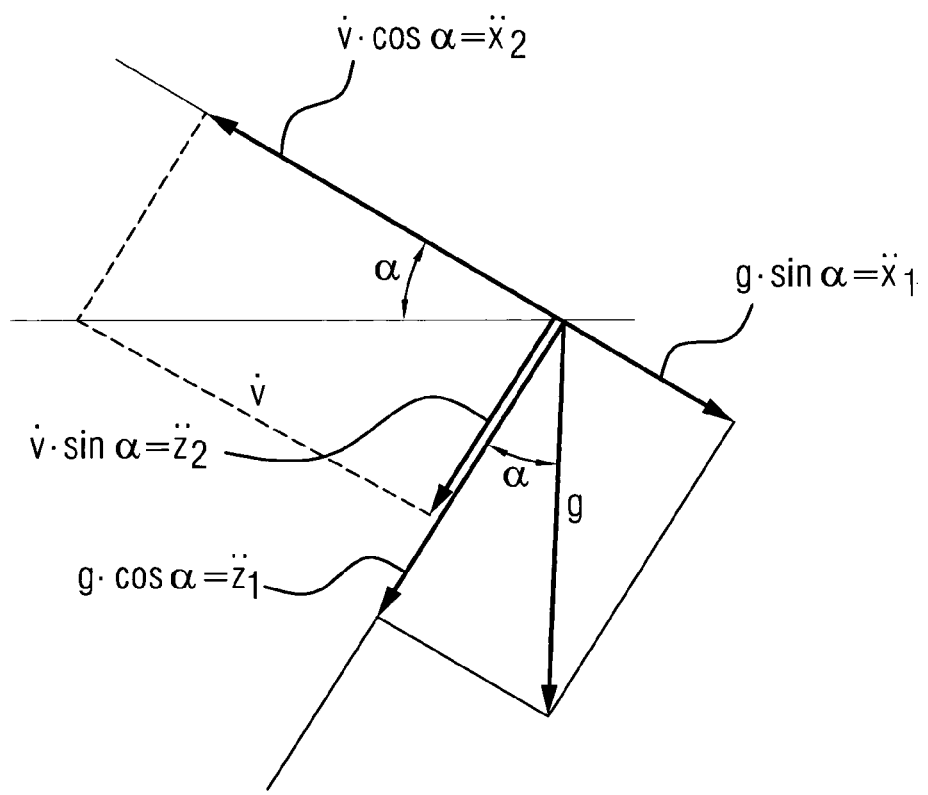
FIG. 9 is a schematic illustration of measured acceleration, particularly for a nonzero pitch angle.

FIG. 9 exemplary, schematically illustrates at least the relation of longitudinal acceleration $\ddot{x}^M$ which is fixed to the motorcycle, overall acceleration of the motorcycle $\dot{v}$, the vertical acceleration $\ddot{z}^M$ which is fixed to the motorcycle and pitch angle α.

The longitudinal acceleration sensor measures a longitudinal acceleration $\ddot{x}^M$ which is fixed to the motorcycle. The longitudinal acceleration $\ddot{x}^M$ results from a gravity portion $\ddot{x}_1$ influencing the longitudinal acceleration measurement depending on the pitch angle α and from an overall acceleration portion of the motorcycle $\ddot{x}_2$ influencing the longitudinal acceleration measurement depending on the pitch angle α:

$$\ddot{x}^M = \ddot{x}_1 + \ddot{x}_2 \qquad (15)$$

The vertical acceleration sensor measures a vertical acceleration $\ddot{z}^M$ which is fixed to the motorcycle. The vertical acceleration $\ddot{z}^M$ results from a gravity portion $\ddot{z}_1$ influencing the vertical acceleration measurement depending on the pitch angle α and from an overall acceleration portion of the motorcycle $\ddot{z}_2$ influencing the vertical acceleration measurement depending on the pitch angle α:

$$\ddot{z}^M = \ddot{z}_1 + \ddot{z}_2 \qquad (15)$$

According to the following approach the calculation of pitch angle α can be deduced:

$$\frac{\ddot{x}^M}{\ddot{z}^M} = \frac{g*\sin\alpha - \dot{v}*\cos\alpha}{g*\cos\alpha + \dot{v}*\sin\alpha} \qquad (15a)$$

$$\ddot{x}^M(g*\cos\alpha + \dot{v}*\sin\alpha) = \ddot{z}^M(g*\sin\alpha - \dot{v}*\cos\alpha)\Big|\frac{1}{\cos\alpha} \qquad (15b)$$

$$\ddot{x}^M g + \ddot{x}^M \dot{v}\tan\alpha = \ddot{z}^M g\tan\alpha - \ddot{z}^M \dot{v} \qquad (15c)$$

$$\ddot{x}^M g + \ddot{z}^M \dot{v} = \tan\alpha(\ddot{z}^M g - \ddot{x}^M \dot{v}) \qquad (16)$$

$$\alpha = \tan^{-1}\left(\frac{\ddot{x}^M g + \ddot{z}^M \dot{v}}{\ddot{z}^M g - \ddot{x}^M \dot{v}}\right) \approx \left(\frac{\ddot{x}^M g + \ddot{z}^M \dot{v}}{\ddot{z}^M g - \ddot{x}^M \dot{v}}\right) \qquad (17)$$

Consequently the pitch angle α is obtainable based on longitudinal acceleration $\ddot{x}^M$ which is fixed to the motorcycle and based on vertical acceleration $\ddot{z}^M$ which is fixed to the motorcycle and based on the overall acceleration of the motorcycle $\dot{v}$ and based on the gravity g, particularly according to formula 17. More particularly preferred the arctan function can be neglected.

Algorithm 81 determines corrected yaw rate $\dot{\psi}^{roadway}$ which is fixed to the roadway. The erroneous roll rate portion $\tilde{\dot{\lambda}}^{roadway}$ is determined by multiplying the roll rate $\dot{\lambda}^M$ which is fixed to the motorcycle with the pitch angle α. Particularly the erroneous roll rate portion $\tilde{\dot{\lambda}}^{roadway}$ is determined by multiplying the roll rate $\dot{\lambda}^M$ with the sinus of the pitch angle α. The corrected yaw rate $\dot{\psi}^{roadway}$ may particularly be determined by subtracting the erroneous roll rate portion $\tilde{\dot{\lambda}}^{roadway}$ from the yaw rate $\dot{\psi}^M$:

$$\tilde{\dot{\lambda}}^{roadway} = \dot{\lambda}^M * \sin(\alpha) \qquad (18)$$

$$\dot{\psi} = \dot{\psi}^{M\_[\$]\$`\$\$[|\$]\$`A T[|\$]\$`g} \dot{\psi}^{roadway} \qquad (19)$$

Algorithm 82 determines corrected roll rate $\dot{\lambda}^{roadway}$ which is fixed to the roadway. The erroneous yaw rate portion $\tilde{\dot{\psi}}^{roadway}$ is determined by multiplying the yaw rate $\dot{\psi}^M$ which is fixed to the motorcycle with the pitch angle α. Particularly the erroneous yaw rate portion $\tilde{\dot{\psi}}^{roadway}$ is determined by multiplying the yaw rate $\dot{\psi}^M$ with the sinus of the pitch angle α. Particularly preferred during high dynamic rolling and/or always a corrected erroneous yaw rate portion [|$]$`$$[|$]$`At[|$]$`[|$]$`$$[|$]$`At$[|$]$`$$ [|$]$`At$[|$]$`$$[|$]$`At[<m]t;epmA $\tilde{\dot{T}}[|$]$`$$[|$]$`At[<m]t;epmg\tilde{\dot{w}}^{roadway}$ is determined by dividing the erroneous yaw rate portion $\tilde{\dot{\psi}}^{roadway}$ by the squared roll rate $(\dot{\lambda}^M)^2$. The corrected roll rate $\dot{\lambda}^{roadway}$ can particularly be determined by subtracting the erroneous yaw rate portion $\tilde{\dot{\psi}}^{roadway}$ or the corrected erroneous yaw rate portion [|$]$`$$[|$]$`At[|$]$`[|$]$`$$[|$]$`At$ [|$]$`$$[|$]$`At$[|$]$`$$[|$]$`At[<m]t;epmA $\tilde{\dot{T}}[|$]$`$$[|$]$`At[<m]t;epmg\dot{w}^{roadway}$ from the roll rate $\dot{\lambda}^M$:

$$\tilde{\dot{\psi}}^{roadway} = \dot{\psi}^M \cdot \sin(\alpha) \qquad (20)$$

$$\tilde{\tilde{\dot{\psi}}}^{roadway} = \frac{\tilde{\dot{\psi}}^{roadway}}{(\dot{\lambda}^M)^2} \qquad (21)$$

$$\dot{\lambda}^{roadway} = \dot{\lambda}^M - \tilde{\dot{\psi}}^{roadway} \qquad (22)$$

$$\dot{\lambda}^{roadway} = \dot{\lambda}^M - \tilde{\tilde{\dot{\psi}}}^{roadway} \qquad (23)$$

In the following a compensation method is described for the second method determining the second roll angle variable $\lambda_2$ in order to increase the precision of the calculation based on vertical centrifugal acceleration. Thereby algorithm 94 estimates a centrifugal force $f_{rad}$. The centrifugal force is proportional to the squared roll rate $\dot{\lambda}^M$ multiplied with a radius $r_{COG}$. The center of gravity of the motorcycle moves on the circumference of a circle, of which the radius $r_{COG}$ is the distance between the tire contact point on the ground and the center of gravity.

$$f_{rad} \sim \dot{\lambda}^{M^2} * r_{COG} \qquad (24)$$

If the center of gravity of the motorcycle is on the vertical axis of the motorcycle this mentioned force is only measured by the vertical acceleration sensor.

Due to body leaning the center of gravity can shift with regard to the vertical axis of the motorcycle. In this case the centrifugal force $f_{rad}$ is partly measured by the lateral acceleration sensor, which has to be compensated.

$$[/\$]\$"\$\$[/\$]\$" A\ddot{t}\ddot{y} = \ddot{y}^M - (\ddot{z}^M - f_{rad}) \qquad (25)$$

Based on the estimated centrifugal force $f_{rad}$, on the lateral acceleration $\ddot{y}^M$ and on the vertical acceleration $\ddot{z}^M$ a centrifugal compensation takes place in algorithm 98 according to e.g. formula 25.

In the following a compensation method is described for the second method determining the second roll angle variable $\lambda_2$ in order to increase the precision of the calculation based on the common effect of the lateral acceleration and the roll rate. Algorithm 95 estimates a rapid leaning force $f_{rap\_leaning}$. The rapid leaning force $f_{rap\_leaning}$ is proportional to the derivative of the roll rate $\dot{\lambda}^M$ and the distance between the tire contact point on the ground and the mounting location of the lateral acceleration sensor $r_{sensor}$.

Based on the estimated rapid leaning force $f_{rap\_leaning}$ and on the lateral acceleration $\ddot{y}^M$ a rapid leaning compensation takes place in algorithm 98 according to e.g. formula 27. Thereby the common effect of the lateral acceleration and the roll rate is compensated.

$$f_{rap\_leaning} \sim \ddot{\lambda}^M * T_{sensor} \quad (26)$$

$$[|\$]\$"\$\$[|\$]\$"A\ddot{t}\ddot{y}^M = \ddot{y}^M - (f_{rap\_leaning}) \quad (27)$$

In the following a compensation method is described for the second method determining the second roll angle variable $\lambda_2$ in order to increase the precision of the calculation by compensating the difference between the total roll angle $\lambda_{ges}$ and the physically active roll angle $\lambda_{th}$. Algorithm 96 estimates a tire profile compensation value. Thereby the gravity g is eliminated in the vertical acceleration $\ddot{z}^M$. This result is multiplied by the yaw rate $\dot{\psi}^M$.

Based on the estimated tire profile compensation value and on the lateral acceleration $\ddot{y}^M$ a tire profile compensation takes place in algorithm 98 according to e.g. formula 28.

$$[|\$]\$"\$\$[|\$]\$"A\ddot{t}\ddot{y}^M = \ddot{y}^M - (\ddot{z}^M - g) * \dot{\psi}^M \quad (28)$$

Algorithm 98 determines the second roll angle variable $\lambda_2$ using the second method. Particularly at least one of the previously described compensation methods are applied, wherein the corrected lateral acceleration $[|\$]\$"\$\$[|\$]\$"A\ddot{t}\ddot{y}^M$ can be used for determining the second roll angle variable $\lambda_2$.

Particularly the corrected yaw rate $\dot{\psi}^{roadway}$ which is fixed to the roadway and the corrected roll rate $\dot{\lambda}^{roadway}$ which is fixed to the roadway are applied for determining the first $\lambda_1$ and/or the second $\lambda_2$ roll angle variable.

Alternatively an aspect of the invention can be described as follows.

Particularly the method to determine the roll angle of a motorcycle is using inertial measurement signals:
 a. Yaw rate
 b. Roll rate
 c. Longitudinal-, lateral- and vertical-acceleration
 d. Vehicle velocity Preferably cross effects between angular rates due to the inclinations of the measurement system are eliminated based on the inertial measurement.

Preferably the motorcycle roll angle is calculated as a combination of roll angles calculated by methods providing roll angle values with different properties.

Preferably the combination is calculated by multiple levels of filtering and summing in order to improve noise cancellation and to reduce offset effects.

Preferably one of the roll angle calculation methods is using a special resettable integrator together with a specially prepared high-pass filter to eliminate roll-rate offset effects.

Preferably one of the roll angle calculation methods is using a compensation method to increase the precision of the calculation based on the vertical centrifugal acceleration.

Preferably one of the roll angle calculation methods is using a compensation method to increase the precision of the calculation based on the common effect of the lateral acceleration and the roll rate.

The invention claimed is:

1. A method to determine a roll angle ($\lambda_E$) of a vehicle, comprising:
   determining, by a processor of the vehicle, a first roll angle variable ($\lambda_1$) from an acquired rolling rate $\dot{\lambda}_m$ ($\dot{\lambda}^M$) of the vehicle using a first method;
   determining, by the processor of the vehicle, a second roll angle variable ($\lambda_2$) from one or more further vehicle movement dynamics characteristic variables using a second method;
   calculating, by a processor of the vehicle, the roll angle ($\lambda_E$) as a combination of at least the first roll angle variable ($\lambda_1$) and the second roll angle variable ($\lambda_2$) by:
     calculating a first combination, by combining the first roll angle variable of the first method high-passed filtered with a first cutoff frequency and the second roll angle variable of the second method low-passed filtered with the first cutoff frequency,
     calculating a second combination, by combining the first roll angle variable of the first method high-passed Filtered with a second cutoff frequency and the second roll angle variable of the second method low-passed filtered with the second cutoff frequency, and
     calculating a third combination as the roll angle ($\lambda_E$) by combining the result of the first combination low-passed filtered with a third cutoff frequency and the result of the second combination high-passed filtered with the third cutoff frequency,
     wherein the first, the second and the third cutoff-frequencies are different; and
   controlling, by the processor of the vehicle, an operation of the vehicle using the roll angle ($\lambda_E$).

2. The method according to claim 1, wherein the combination comprises multiple levels, wherein each level comprises at least one filtering step and at least one combination step.

3. The method according to claim 1, wherein the first roll angle variable ($\lambda_1$) has different characteristics than the second roll angle variable ($\lambda_2$).

4. The method according to claim 1, wherein the second roll angle variable ($\lambda_2$) is determined from:
   a yaw rate of the vehicle and a vehicle velocity; and/or
   a lateral acceleration and vertical acceleration of the vehicle.

5. The method according claim 1, further comprising eliminating, based on inertial measurement, cross effects occurring between angular rates due to inclinations of a measurement system, wherein the cross effects are erroneous angular rates.

6. The method according to claim 1, wherein one of the roll angle variable determination methods applies a resettable integrator in combination with a resettable high-pass filter to eliminate roll-rate offset effects.

7. The method according to claim 6, wherein the first method applies an integrator for determining the first roll angle variable ($\lambda_1$), wherein the integrator and direct subsequent high-pass filters are reset when the output of the integrator reaches a predefined threshold.

8. The method according to claim 1, wherein the processor uses a compensation method to increase a precision of the calculation of the first roll angle variable ($\lambda_1$) and the second roll angle variable ($\lambda_2$) based on a vertical centrifugal acceleration.

9. The method according to claim 1, wherein the processor uses a compensation method to increase a precision of the calculation of the first roll angle variable ($\lambda_1$) and the second roll angle variable ($\lambda_2$) based on lateral acceleration and roll rate.

10. The method according to claim 1, wherein
the first roll angle variable is for rapidly changing roll angle values, and
the second roll angle variable is for steady roll angle values, wherein the combination takes place in a frequency domain.

11. The method according to claim 1, wherein an amplitude of high frequencies of the roll angle variable of the first method is weighted higher than an amplitude of high frequencies of the roll angle variable of the second method, wherein an amplitude of low frequencies of the roll angle variable of the second method is weighted higher than an amplitude of low frequencies of the roll angle variable of the first method, wherein an amplitude of mid frequencies are weighted similarly.

12. The method according to claim 1 wherein the third cutoff frequency lies between the first cutoff frequency and the second cutoff frequency.

13. A method to determine a roll angle ($\lambda_E$) of a vehicle, comprising:
determining, by a processor of the vehicle, a first roll angle variable ($\lambda_1$) from an acquired rolling rate ($\dot{\lambda}^M$) of the vehicle using a first method;
determining, by the processor of the vehicle, a second roll angle variable ($\lambda_2$) from one or more further vehicle movement dynamics characteristic variables using a second method;
calculating, by a processor of the vehicle, the roll angle ($\lambda_E$) as a combination of at least the first roll angle variable ($\lambda_1$) and the second roll angle variable ($\lambda_2$) and
controlling, by the processor of the vehicle, an operation of the vehicle using the roll angle ($\lambda_E$),
wherein the combination comprises multiple levels, wherein each level comprises at least one filtering step and at least one combination step, and
wherein the number of levels is x, wherein the y-st level comprises $2^{x-y+1}$ filtering steps and $2^{x-y}$ combination steps, wherein the output of level y is the input of level y+1, and wherein in the y-st level $2^{x-y}$ cutoff frequencies are applied.

14. A device to determine a roll angle ($\lambda_E$) of a vehicle, comprising:
a processor of the vehicle configured to:
determine a first roll angle variable ($\lambda_1$) from an acquired rolling rate ($\dot{\lambda}^M$) of the vehicle using a first method;
determine a second roll angle variable ($\lambda_2$) from one or more further vehicle movement dynamics characteristic variables using a second method;
calculate the roll angle ($\lambda_E$) as a combination of at least the first roll angle variable ($\lambda_1$) and the second roll angle variable ($\lambda_2$) by:
calculating a first combination, by combining the first roll angle variable of the first method high-passed filtered with a first cutoff frequency and the second roll angle variable of the second method low-passed filtered with the first cutoff frequency,
calculating a second combination, by combining the first roll angle variable of the first method high-passed filtered with a second cutoff frequency and the second roll angle variable of the second method low-passed filtered with the second cutoff frequency, and
calculating a third combination as the roll angle ($\lambda_E$), by combining the result of the first combination low-passed filtered with a third cutoff frequency and the result of the second combination high-passed filtered with the third cutoff frequency,
wherein the first, the second and the third cutoff-frequencies are different; and
control an operation of the vehicle using the roll angle ($\lambda_E$).

* * * * *